(12) United States Patent
Adema et al.

(10) Patent No.: US 11,474,377 B2
(45) Date of Patent: Oct. 18, 2022

(54) COMBINER LENS AND METHOD OF MAKING THEREOF

(71) Applicant: GOOGLE LLC, Mountain View, CA (US)

(72) Inventors: Daniel Robert Adema, Kitchener (CA); Jaehong Choi, Waterloo (CA)

(73) Assignee: Google LLC, Mountain View, CA (US)

(*) Notice: Subject to any disclaimer, the term of this patent is extended or adjusted under 35 U.S.C. 154(b) by 325 days.

(21) Appl. No.: 16/856,353

(22) Filed: Apr. 23, 2020

(65) Prior Publication Data
US 2020/0341295 A1 Oct. 29, 2020

Related U.S. Application Data

(60) Provisional application No. 62/837,764, filed on Apr. 24, 2019.

(51) Int. Cl.
*G02B 27/01* (2006.01)
*G02C 7/02* (2006.01)

(52) U.S. Cl.
CPC .......... *G02C 7/02* (2013.01); *G02B 27/0172* (2013.01); *G02B 2027/0178* (2013.01); *G02C 2202/16* (2013.01)

(58) Field of Classification Search
CPC ................. G02C 2202/16; G02C 7/02; G02B 2027/0194; G02B 2027/0178; G02B 27/0172; G02B 27/017; G02B 27/01; G02B 27/0101

USPC ......................................................... 359/630
See application file for complete search history.

(56) References Cited

U.S. PATENT DOCUMENTS

| | | | |
|---|---|---|---|
| 2012/0218481 A1* | 8/2012 | Popovich | G02B 5/1819 349/11 |
| 2013/0101253 A1* | 4/2013 | Popovich | G02B 27/017 385/37 |
| 2015/0160529 A1* | 6/2015 | Popovich | G02B 26/101 359/200.8 |
| 2016/0055822 A1* | 2/2016 | Bell | G02B 27/017 345/207 |
| 2016/0077338 A1* | 3/2016 | Robbins | G02B 27/4205 359/489.08 |
| 2017/0052374 A1* | 2/2017 | Waldern | G02F 1/13342 |
| 2018/0246333 A1* | 8/2018 | Cheng | G02B 6/0055 |
| 2018/0321736 A1* | 11/2018 | Masson | G02B 30/36 |
| 2019/0004317 A1* | 1/2019 | Komatsu | G02B 6/00 |

* cited by examiner

*Primary Examiner* — William R Alexander (57) ABSTRACT

A combiner lens includes a first lens, a lightguide, and a second lens. The first lens includes a first lens body and a flange integrally formed with the first lens body. The first lens body and flange define a main cavity. The flange has a first joint surface. The lightguide is disposed at least partially in the main cavity. The second lens includes a second lens body positioned in stack with the lightguide and the first lens body. The second lens has a second joint surface in opposing relation to the first joint surface. The second lens is attached to the first lens by a joint formed between the first joint surface and the second joint surface.

20 Claims, 7 Drawing Sheets

COMBINER LENS AND METHOD OF MAKING THEREOF

CROSS-REFERENCE TO RELATED APPLICATIONS

This application claims the benefit of U.S. Provisional Application No. 62/837,764, filed 24 Apr. 2019, titled "Combiner Lens and Method of Making Thereof", the content of which is incorporated herein in its entirety by reference.

TECHNICAL FIELD

The disclosure relates to lens integration and to a combiner lens design that enables mass manufacturing of wearable heads-up displays (WHUDs).

BACKGROUND

WHUDs are wearable electronic devices that use optical combiners to combine real world and virtual images. The optical combiner may be integrated with one or more lenses to provide a combiner lens that may be fitted into a support frame of a WHUD. The combiner lens would provide an eyebox that is viewable from an eye of a user when the WHUD is worn on the head of the user. The combiner lens may include an eyeglass prescription in addition to providing the eyebox. To enable mass manufacturing of the WHUD, a support frame of the WHUD that holds the combiner lens may be provided in standard sizes. However, for a range of users that can wear a given frame size, the prescriptions of the users may vary and/or the eye positions of the users relative to the frame may vary over the range. This generally means that a range of combiner lenses with different prescriptions and/or different eyebox positions may be needed to service the range of users. To enable mass manufacturing of WHUDs, there is a need in the art for a combiner lens design that is adaptable to a wide range of users for a given frame size.

SUMMARY

In a first aspect, a combiner lens may be summarized as including a first lens including a first lens body and a flange integrally formed with the first lens body, the first lens body and flange defining a main cavity, the flange having a first joint surface; a lightguide disposed at least partially in the main cavity; and a second lens including a second lens body positioned in stack with the lightguide and the first lens body, the second lens having a second joint surface in opposing relation to the first joint surface, the second lens attached to the first lens by a joint formed between the first joint surface and the second joint surface.

Variants of the combiner lens according to the first aspect may further include one or more of the features described in A1 to A8 below.

A1: The first joint surface and the second joint surface may be oriented in a vertical direction relative to a plane of the lightguide. Alternatively, the first joint surface and the second joint surface may be oriented in a slanted direction relative to the plane of the lightguide. Alternatively, a first portion of the first joint surface and a first portion of the second joint surface in opposing relation to the first portion of the first joint surface may be oriented in a first direction, and a second portion of the first joint surface and a second portion of the second joint surface in opposing relation to the second portion of the first joint surface may be oriented in a second direction that is different from the first direction. The first direction may be vertical or slanted relative to the plane of the lightguide, and the second direction may be in-plane relative to the plane of the lightguide.

A2: The first lens may include a first lens tab projecting from a periphery of the first lens body. A first portion of the flange may be integrally formed with the first lens body, and a second portion of the flange may be integrally formed with the first lens tab. The second portion of the flange and the first lens tab may define a side cavity. The side cavity may be connected to the main cavity. A first portion of the lightguide carrying an output coupler may be disposed in the main cavity. A second portion of the lightguide carrying an input coupler may be disposed in the side cavity. At least one optical function may be added to the second portion of the flange. The optical function may redirect light that is not coupled into the lightguide. The second portion of the flange may include a lip portion overhanging the first lens tab. The side cavity may be defined between the lip portion and the first lens tab. The lip portion may be optically transparent to permit transmission of light to the side cavity. An aperture may be formed in the lip portion to permit transmission of light to the side cavity. An optical element may be positioned in the aperture to steer light received at the aperture to the input coupler. The optical element may be a prism. A mirror may be positioned relative to the side cavity to reflect light transmitted through the second portion of the lightguide back towards the second portion of the lightguide. An access hole may be formed in the first lens body. The access hole may be connected to the side cavity. A seal cap may be mounted at the access hole. A mirror coating may be applied to a surface of the seal cap exposed to the side cavity. The second lens may include a second lens tab projecting from the second lens body. The first joint surface may include an inner peripheral surface of the lip portion, and the second joint surface may include an outer peripheral surface of the second lens tab.

A3: A first seat may be formed on the first lens body or on the flange. The first seat may be proximate a periphery of the first lens, and the lightguide may be mounted on the first seat. A height of the first seat relative to the stack formed by the first lens body, the lightguide, and the second lens may be set to provide a gap between the first lens body and a major surface of the lightguide that opposes the first lens body.

A4: A second seat may be formed on the flange, and the second lens may be mounted on the second seat. A height of the second seat relative to the stack formed by the first lens body, the lightguide, and the second lens may be set to provide a gap between the second lens and a major surface of the lightguide that opposes the second lens.

A5: The flange may be an annular flange.

A6: The first lens body may be a meniscus lens. Alternatively, the first lens body may be a planoconvex lens.

A7: The second lens body may be a planoconcave lens. Alternatively, the second lens body may be a biconcave lens.

A8: The lightguide may be a planar lightguide.

In a second aspect, a wearable heads-up display may be summarized as including a support frame, which has a frame front and at least one temple coupled to a side of the frame front, and a combiner lens according to the first aspect (or a variation thereof), which is mounted to the frame front.

In a third aspect, a method of forming a combiner lens according to the first aspect (or a variation thereof) may be summarized as including stacking a lightguide relative to a lens body of a first lens by disposing the lightguide in a cavity defined by the lens body of the first lens and a flange of the first lens, positioning a joint surface of a second lens in opposing relation to a joint surface of the flange by stacking the second lens relative to the lightguide and the lens body of the first lens, and attaching the second lens to the first lens by forming a joint between the joint surface of the flange and the joint surface of the second lens.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

Figure 1A:
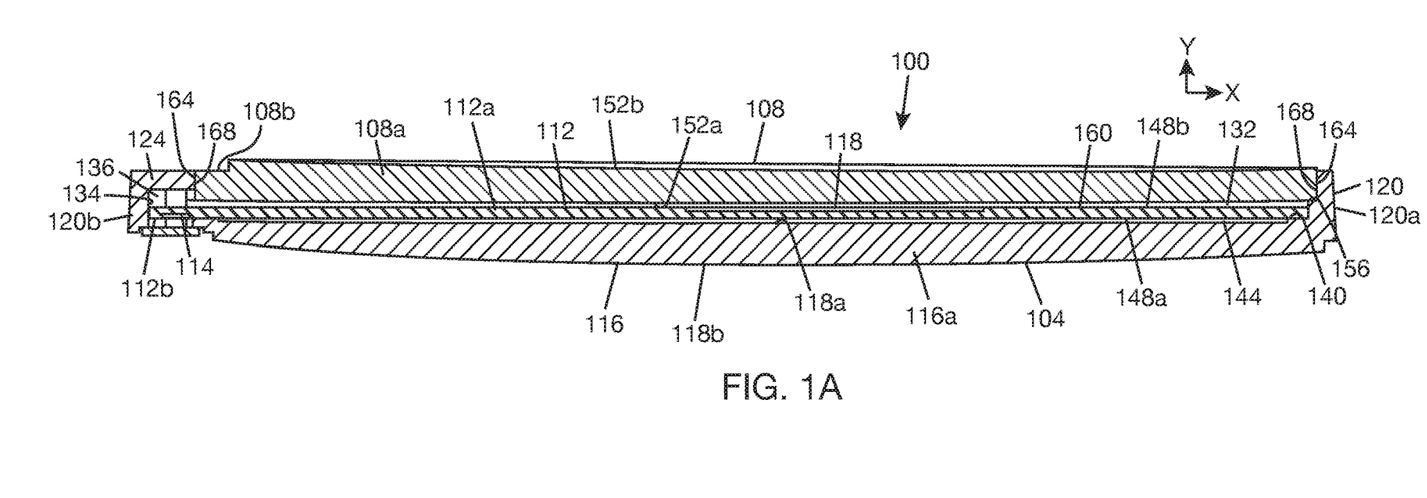
FIG. 1A is a cross-sectional view of a combiner lens along line 1A-1A of FIG. 3.
Figure 1B:
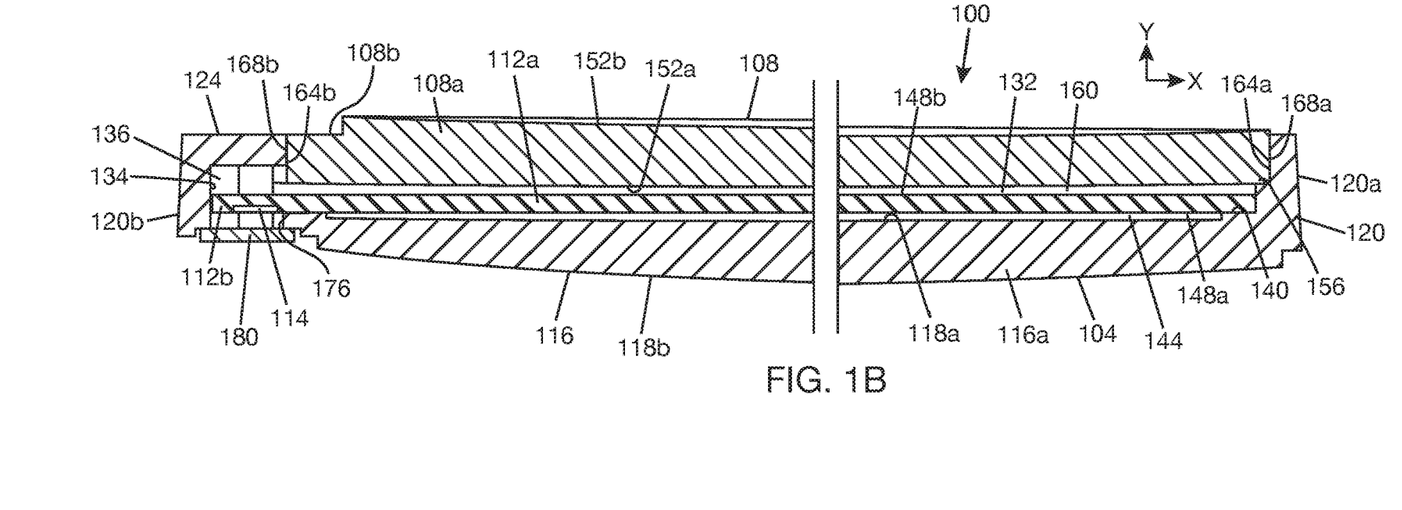
FIG. 1B is an enlarged and broken view of FIG. 1A.

FIGS. 1A and 1B show a combiner lens 100 that is designed to be mass manufactured. Combiner lens 100 includes a world side (WS) lens 104, an eye side (ES) lens 108, and a lightguide (or waveguide) 112 arranged generally in a stack. The terms "world side" and "eye side" are relative to use of combiner lens 100 as an eyeglass, where ES lens 108 will face the eye (or will be the lens nearest to the eye), and WS lens 104 will face the world (or will be the lens farthest from the eye). Lightguide 112 is positioned between WS lens 104 and ES lens 108. WS lens 104 and ES lens 108 may be formed from a suitable lens material, such as plastic, e.g., a polycarbonate material, or glass. WS lens 104 may be formed by molding to allow integration of features to support lightguide 112 and ES lens 108. ES lens 108 may be formed by molding and/or machining. Combiner lens 100 may include an input coupler 114 to couple light into lightguide 112 and an output coupler 118 to couple light out of lightguide 112. Both couplers 114, 118 are carried by lightguide 112. Lightguide 112 may carry other optical elements not shown, such as exit pupil expanders. Lightguide 112 may be made of plastic or glass or other material capable of transferring light by TIR.

Figure 2A:
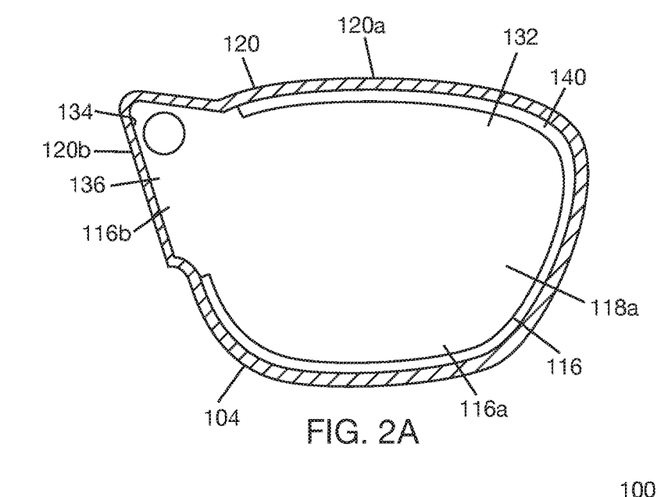
FIG. 2A is cross-sectional view of a world side lens of the combiner lens of FIGS. 1A, 1B, and 3.
Figure 2B:
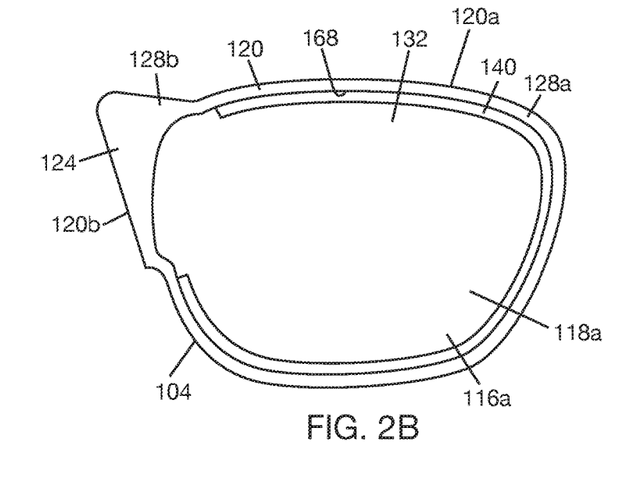
FIG. 2B is a top view of the world side lens of FIG. 2A.

Referring to FIGS. 1A, 1B, 2A, and 2B, WS lens 104 has a base body 116 including a lens body 116a and a lens tab 116b (in FIG. 2A). Lens tab 116b projects from a portion of a periphery of lens body 116a and is integrally formed with lens body 116a. Lens body 116a may be a meniscus lens, where an inner surface 118a of lens body 116a is concave and an outer surface 118b (in FIGS. 1A and 1B) of lens body 116a is convex. Alternatively, lens body 116a may be a planoconvex lens, where the inner surface 118a of lens body 116a is planar and the outer surface 118b of lens body 116a is convex. WS lens 104 has a flange 120 integrally formed with base body 116. Flange 120 is located proximate a periphery of base body 116. Referring to FIG. 2A, flange 120 has a first flange portion 120a that is located on lens body 116a (proximate a periphery of lens body 116a) and a second flange portion 120b that is located on lens tab 116b (proximate a periphery of lens tab 116b). First flange portion 120a is contiguous with second flange portion 120b to form an annular flange. Referring to FIG. 2B, top surface 128a of first flange portion 120a is contiguous with top surface 128b of second flange portion 120b to form a continuous, generally annular, surface. Returning to FIGS. 1A and 1B, first flange portion 120a and lens body 116a define a main cavity 132. A recess 134 between second flange portion 120b and lens tab 116b (in FIG. 2A) defines a side cavity 136. Side cavity 136 is connected to main cavity 132 where lens body 116a is connected to lens tab 116b. A lip portion 124 of second flange portion 120 overhangs side cavity 136 and lens tab 116b.

Referring to FIGS. 1A and 1B, lightguide 112 has a lightguide body 112a and a lightguide tab 112b. Lightguide tab 112b projects from a portion of a periphery of lightguide body 112a and is integrally formed with lightguide body 112a. Lightguide tab 112b forms an input area of lightguide 112 and may carry input coupler 114. Lightguide 112a carries output coupler 118. Lightguide body 112a is disposed in main cavity 132 with lightguide tab 112b extending into side cavity 136. WS lens 104 may have a seat 140 on which lightguide 112, or lightguide body 112a, may be mounted. Seat 140 is positioned proximate a periphery of lens body 116a so as to leave the central portion of lens body 116a clear (see seat 140 in FIGS. 2A and 2B). Seat 140 may be formed on lens body 116a or on first flange portion 120a. A height of seat 140 (in FIGS. 1A and 1B) relative to the combiner lens stack may be set to provide a gap 144 between a bottom surface 148a of lightguide 112 and inner lens surface 118a. The shape of inner lens surface 118a relative to the shape of bottom lightguide surface 148a may also contribute to or define gap 144. Although not shown, spacers may be arranged in gap 144 to maintain gap 144 at a set height.

Figure 3:
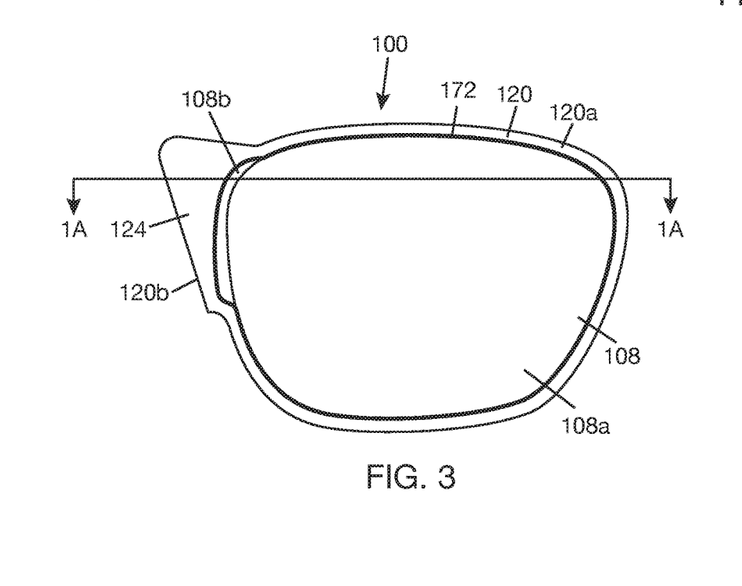
FIG. 3 is a top view of the combiner lens shown in FIG. 1A.

Referring to FIGS. 1A, 1B, and 3, ES lens 108 has a lens body 108a and a lens tab 108b. Lens tab 108b projects from a portion of a periphery of lens body 108a and is integrally formed with lens body 108a. Lens body 108a may be a biconcave lens, where an inner lens surface 152a of lens body 108a is concave and an outer lens surface 152b is concave. In other examples, lens body 108a may be a planoconcave lens, where inner lens surface 152a is planar and outer lens surface 152b is concave. ES lens 108 is disposed in main cavity 132 in stack with lightguide body 112a, with inner lens surface 152a in opposing relation to a top surface 148b of lightguide 112. A seat 156 for mounting ES lens 108 in stack with lightguide body 112a may be formed on first flange portion 120a. A height of seat 156 relative to the combiner lens stack may be set to provide a gap 160 between inner lens surface 152a and top lightguide surface 148b. The shape of inner lens surface 152a relative to top lightguide surface 148b may also contribute to gap 160 or define gap 160. Although not shown, spacers may be arranged in gap 160 to maintain gap 160 at a set height.

When ES lens 108 is disposed in main cavity 132 or mounted on seat 156, an outer peripheral surface 164 of ES lens 108 is positioned in opposing relation to an inner peripheral surface 168 of flange 120. In one implementation, a first portion 164a (in FIG. 1B) of inner peripheral surface 164 is located on first flange portion 120a, and a second portion 164b (in FIG. 1B) of inner peripheral surface 164 is located on second flange portion 120b, e.g., on flange lip portion 124. A first portion 168a (in FIG. 1B) of outer peripheral surface 168 is located on lens body 108a, and a second portion 168b (in FIG. 1B) of outer peripheral surface 168 is located on lens tab 108b. Lens tab 108b abuts flange lip portion 124 such that the second portion 164b of inner peripheral surface 164 and the second portion 168b of outer peripheral surface 168 are in opposing relation. Similarly, the first portion 164a of inner peripheral surface 164 and the first portion 168a of outer peripheral surface 168 are in opposing relation. To attach ES lens 108 to WS lens 104, a joint 172 (illustrated with a thick line in FIG. 3) is formed between opposing surfaces 164, 168. Joint 172 is continuous to provide a seal around a periphery of main cavity 132. Joint 172 may be a lap joint or other type of joint that can be formed between two overlapping surfaces.

Figure 4:
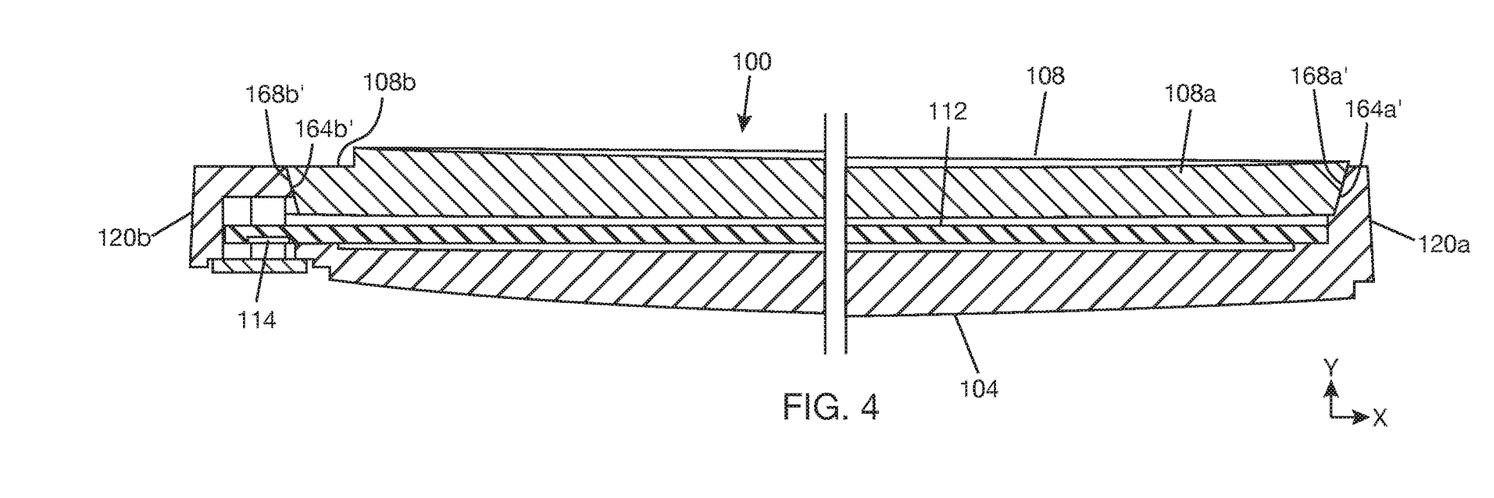
FIG. 4 is a cross-sectional view of a combiner lens showing a slanted joint between a flange of a world side lens and an eye side lens.

In one example, as illustrated in FIGS. 1A and 1B, surfaces 164 (164a, 164b), 168 (168a, 168b) are vertical surfaces, i.e., surfaces 164, 168 are vertical relative to a plane of lightguide 112—the plane of lightguide 112 is generally parallel to the major surfaces 148a, 148b of lightguide 112. If the plane of lightguide is assumed to be parallel to the XZ plane, then surfaces 164, 168 are oriented along the Y direction. The joint 172 formed between vertical surfaces 164, 168 may be described as a vertical joint. In another example, as illustrated in FIG. 4, joint surface 164a' of first flange portion 120a and joint surface 168a' of ES lens body 108a are slanted or inclined relative to the plane of lightguide 112, and joint surface 164b' of second flange portion 120b and joint surface 168b' of ES lens tab 108b are slanted or inclined relative to the plane of lightguide 112. The joint formed between the opposing slanted surfaces may be described as a slanted joint.

Figure 5A:
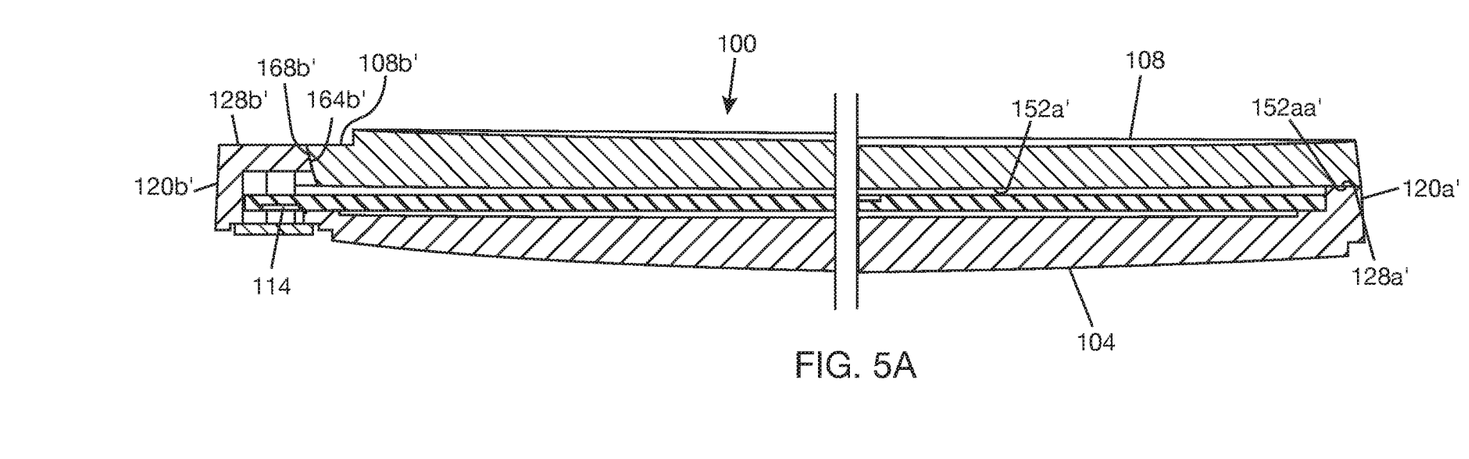
FIG. 5A is a cross-sectional view of a combiner lens showing a combination of a slanted joint and an in-plane joint between a flange of a world side lens and an eye side lens.
Figure 5B:
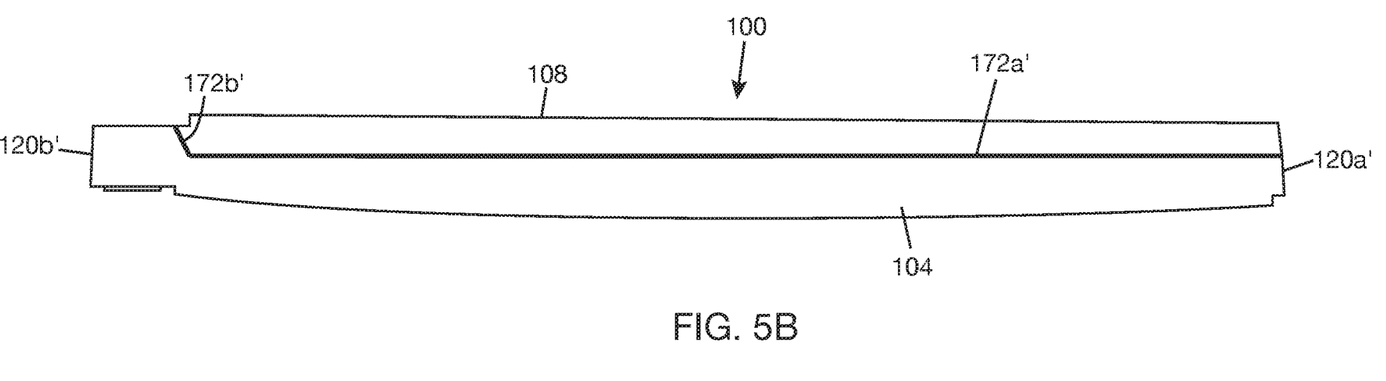
FIG. 5B is a side view of the combiner lens shown in FIG. 5A.
Figure 5C:
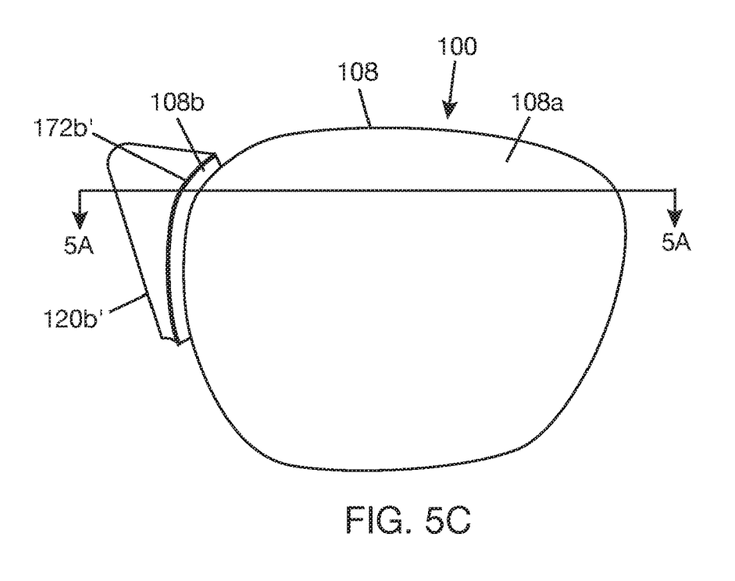
FIG. 5C is a top view of the combiner lens shown in FIG. 5A.

FIG. 5A shows another example where a first joint (illustrated with thick line 172a' in FIG. 5B) is formed between a top surface 128a' of first flange portion 120a' and an edge portion 152aa' of inner lens surface 152a' of ES lens body 108a' and a second joint (illustrated with thick line 172b' in FIGS. 5B and 5C) is formed between inner peripheral surface 164b' of second flange portion 102b' and an outer peripheral surface 168b' of ES lens tab 108b', where the orientation of first joint 172a' is different from the orientation of second joint 172b'. In the illustrated example, first joint 172a' is an in-plane joint, i.e., a joint formed between joint surfaces that are generally parallel to a plane of lightguide 112, and second joint 172b' is a slanted joint. In another example, second joint 172b' may be a vertical joint while first joint 172a' is an in-plane joint. In-plane joint 172a' will have the effect of hiding the first flange portion 120a' under (or behind) ES lens body 108a', as shown in FIGS. 5B and 5C. Both in-plane joint 172a' and slanted 172b' (or vertical 172') joint will jointly seal between ES lens 108 and the flange 120 of WS lens 104.

Figure 6A:
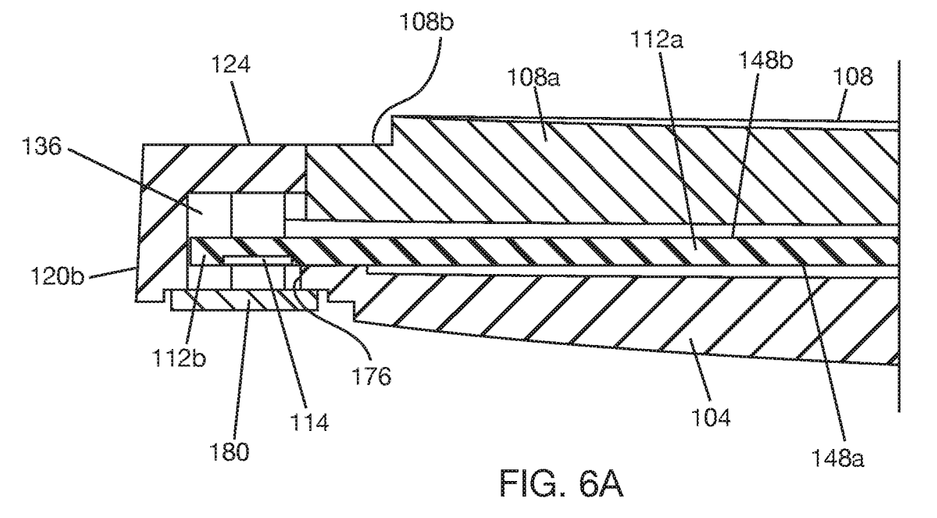
FIG. 6A is a cross-sectional view of a portion of a combiner lens including an input area of a lightguide and is an enlargement of a portion of the combiner lens shown in FIG. 1A.
Figure 6B:
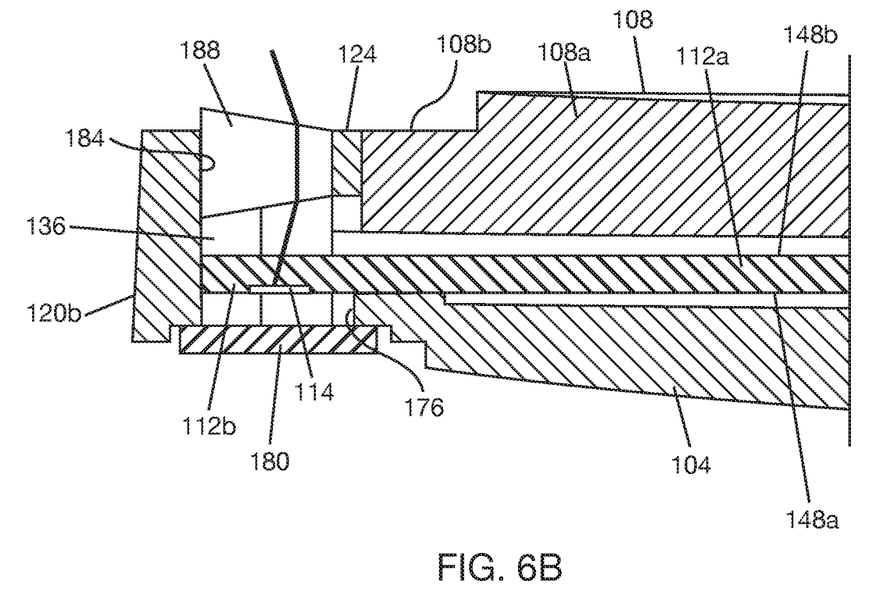
FIG. 6B is a cross-sectional view of a portion of a combiner lens including an input area of a lightguide and shows an aperture in a flange of a world side lens to feed light to the input area of the lightguide.
Figure 6C:
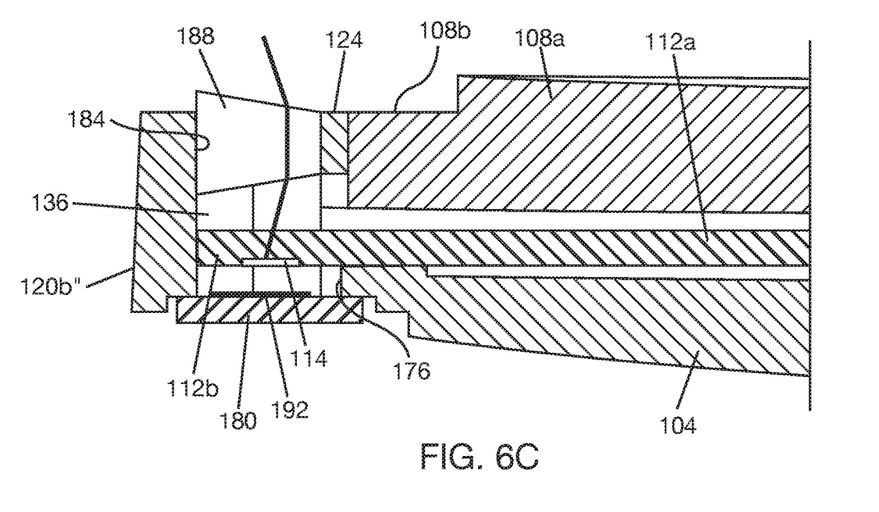
FIG. 6C is cross-sectional view of a portion of a combiner lens including an input area of a lightguide and shows a mirror positioned to reflect light back to the input area of the lightguide.

Referring to FIG. 6A, an access hole 176 that is connected to side cavity 136 may be formed in WS lens 104. Access hole 176 may be in-line with lip portion 124 of second flange portion 120b. A seal cap 180 may be mounted at access hole 176 when access to side cavity 136 is no longer needed, e.g., in the final combiner lens assembly. In one implementation, lip portion 124 of second flange portion 120*b* is transparent to at least some optical wavelengths of electromagnetic energy, e.g., wavelengths in the visible range. This will allow light to pass through lip portion 124 to input coupler 114. In another implementation, as shown in FIG. 6B, an aperture 184 is formed in lip portion 124 of second flange portion 120*b*". Aperture 184 is connected to side cavity 136 and forms a window through which light can be transmitted to input coupler 114. An optical element 188, such as a prism, may be mounted in hole 184 to steer light to input coupler 114 such that light is incident on input coupler 114 at angles that will enable input coupler 114 to couple the light into lightguide 112 for propagation by TIR. FIG. 6C shows a mirror coating 192 applied to a surface of seal cap 180 exposed to side cavity 136. Mirror coating 192 will reflect light that escapes input coupler 114 or lightguide portion 112*b* back into side cavity 136. Mirror coating 192 is generally in opposing relation with lightguide portion 112*b* that carries input coupler 114 and may generally be in-line with input coupler 114. Mirror coating 192 will reflect light into the side cavity 136 in a direction towards input coupler 114.

Figure 7:
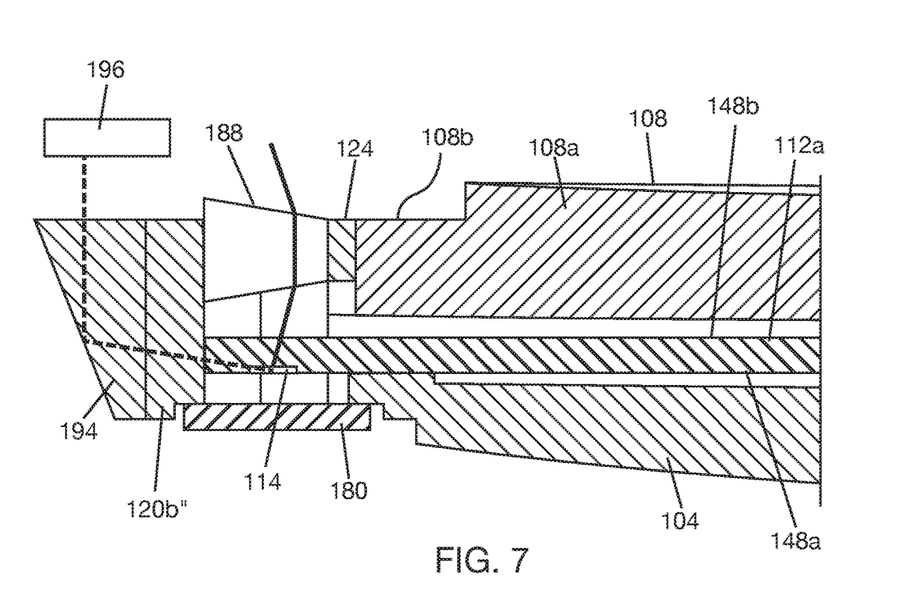
FIG. 7 is a cross-sectional view of a portion of a combiner lens including an input area of a lightguide and shows an optical function added to a flange of a world side lens to redirect light that is not coupled into the lightguide.

One or more optical functions may be added to second flange portion 120*b*" (120*b*, 120*b*'). For example, FIG. 7 shows a light redirecting (or deflecting) element 194 added, e.g., attached, to second flange portion 120*b*". Light redirecting element 194 may be positioned to receive a portion of light that is not coupled into lightguide 112 by input coupler 114 and to redirect the uncoupled light to a photodiode 196.

FIGS. 1A, 1B, 4, 5A, 6A, 6B, 6C, and 7 show input coupler 114 proximate bottom lightguide surface 148*a*. In general, this will mean that input coupler 114 is configured as a reflection coupler. If input coupler 114 is configured as a transmission coupler, input coupler 114 can be positioned proximate top lightguide surface 148*b* instead. In some cases, input coupler 114 may have two coupler elements, where one coupler element could be placed proximate top lightguide surface 148*b* and the other coupler element could be placed proximate bottom lightguide 148*a*. In general, any suitable configuration of input coupler 114 and positioning of input coupler 114 on lightguide 112 may be used. This applies to output coupler 118 as well, i.e., any suitable configuration and positioning of output coupler 118 on lightguide 112 may be used.

With combiner lens 100 as described above, the size and design of WS lens 104 and lightguide 112 can remain the same for a given frame size of a WHUD. The ES lens 108 can be adjusted to accommodate the eye prescription, if any, of the user. Thus, the only component of the combiner lens 100 that will change for the given frame size is the ES lens 108. The eyebox center of the lightguide 112 will be fixed to the WS lens 104, and the eyebox can be made large enough to provide the desired eyebox to the user regardless of the eye position of the user relative to the given frame. The optical axis of ES lens 108 will need to be aligned with the eye of the user. However, the optical axis of ES lens 108 does not need to be aligned with the optical axis of WS lens 108. Moreover, the optical axis of ES lens 108 can be slightly offset from the eyebox center of the lightguide 112, e.g., by up to 5 mm, without disturbing the ability of the combiner lens to transfer an image to the eye of the user.

Figure 8:
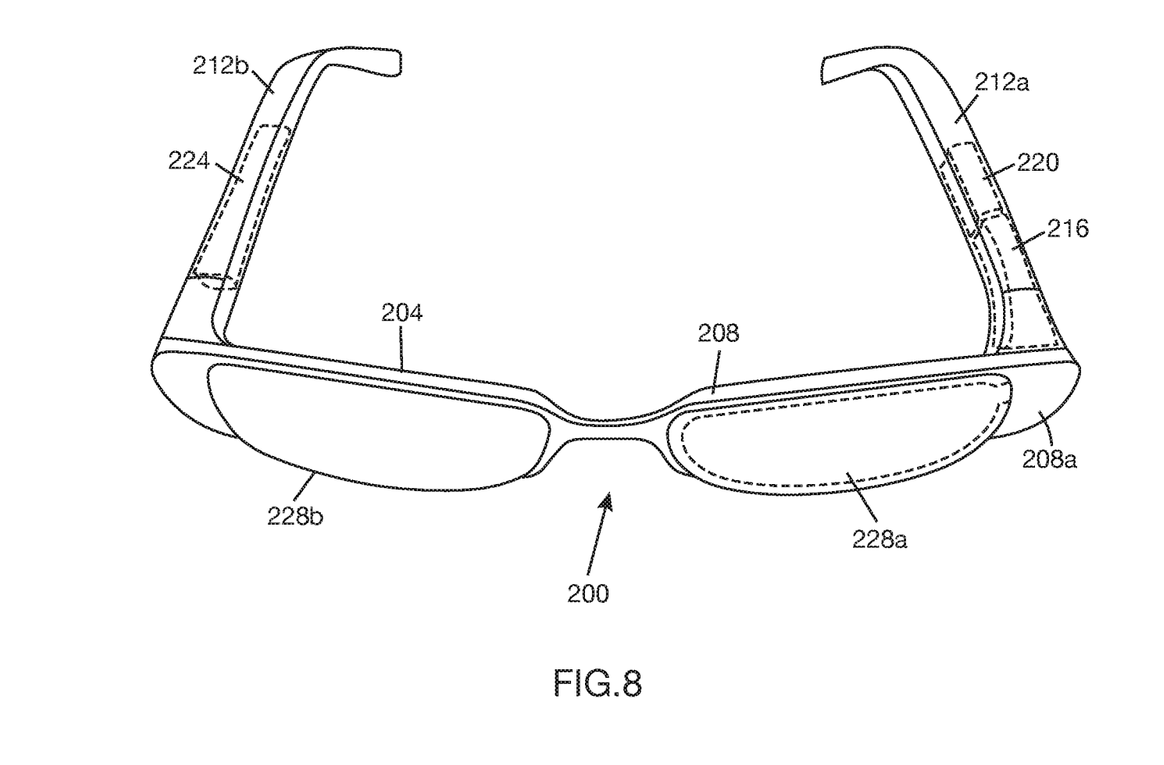
FIG. 8 is a perspective view of an example WHUD including a combiner lens.

FIG. 8 illustrates an example WHUD 200 that may use a combiner lens as described above. WHUD 200 may be a retinal display that projects light carrying an image to the retina of a user. The user will have a perception of seeing an image on a display screen floating in space some distance in front of the eye. However, in reality the image is on the retina and not on a display screen. WHUD 200 includes a support frame 204 that carries the devices, electronics, and software that enable WHUD to display content. In one example, support frame 204 includes a frame front 208 and temples 212*a*, 212*b* attached to opposite sides of frame front. Many of the components of WHUD, e.g., display light source 216, electronics module 220, and battery 224, are carried by or within temples 212*a*, 212*b*. Frame front 208 carries a pair of eyeglasses 228*a*, 228*b*. At least eyeglass 228*a* may be a combiner lens as described above. Frame front 208 has a widened corner 208*a* to receive the widened corner of combiner lens 100 (in FIGS. 2C and 5C), i.e., the portion of the combiner lens including the second flange portion 120*b*, 120*b*' (in FIGS. 2C and 5C). This will place the lip portion 124 (in FIGS. 6A-6C), or aperture 184 (in FIGS. 6B and 6C) in lip portion 124, in a path to receive light from display light source 216.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A combiner lens, comprising:
a first lens including a first lens body and a flange integrally formed with the first lens body, the first lens body and flange defining a main cavity, the flange having a first joint surface;
a lightguide disposed at least partially in the main cavity; and
a second lens including a second lens body positioned in stack with the lightguide and the first lens body, the second lens having a second joint surface in opposing relation to the first joint surface, the second lens attached to the first lens by a joint formed between the first joint surface and the second joint surface.

2. The combiner lens of claim 1, wherein the first joint surface and the second joint surface are oriented in at least one direction selected from a group consisting of: a vertical direction relative to a plane of the lightguide, and a slanted direction relative to a plane of the lightguide.

3. The combiner lens of claim 1, wherein a first portion of the first joint surface and a first portion of the second joint surface in opposing relation to the first portion of the first joint surface are oriented in a first direction, and wherein a second portion of the first joint surface and a second portion of the second joint surface in opposing relation to the second portion of the first joint surface are oriented in a second direction that is different from the first direction.

4. The combiner lens of claim 1, wherein the first lens includes a first lens tab projecting from a periphery of the first lens body, wherein a first portion of the flange is integrally formed with the first lens body, and wherein a second portion of the flange is integrally formed with the first lens tab.

5. The combiner lens of claim 4, wherein the second portion of the flange and the first lens tab define a side cavity, wherein the side cavity is connected to the main cavity, wherein a first portion of the lightguide is disposed in the main cavity and a second portion of the lightguide is disposed in the side cavity, wherein the first portion of the lightguide carries an output coupler, and wherein the second portion of the lightguide carries an input coupler.

6. The combiner lens of claim 5, further comprising at least one optical function added to the second portion of the flange.

7. The combiner lens of claim 5, wherein the second portion of the flange includes a lip portion overhanging the first lens tab, and wherein the side cavity is defined between the lip portion and the first lens tab.

8. The combiner lens of claim 7, wherein the lip portion is optically transparent to permit transmission of light to the side cavity.

9. The combiner lens of claim 7, further comprising:
an aperture formed in the lip portion to permit transmission of light to the side cavity, and
an optical element positioned in the aperture to steer light received at the aperture to the input coupler.

10. The combiner lens of claim 7, further comprising a mirror positioned relative to the side cavity to reflect light transmitted through the second portion of the lightguide back towards the second portion of the lightguide.

11. The combiner lens of claim 7, further comprising an access hole formed in the first lens body, the access hole connected to the side cavity.

12. The combiner lens of claim 11, further comprising a seal cap mounted at the access hole and a mirror coating applied to a surface of the seal cap exposed to the side cavity.

13. The combiner lens of claim 7, wherein the second lens includes a second lens tab projecting from the second lens body, wherein the first joint surface includes an inner peripheral surface of the lip portion, and wherein the second joint surface includes an outer peripheral surface of the second lens tab.

14. The combiner lens of claim 1, further comprising a seat formed on the first lens body or on the flange, the seat proximate a periphery of the first lens body, wherein the lightguide is mounted on the seat.

15. The combiner lens of claim 14, wherein a height of the seat relative to the stack formed by the first lens body, the lightguide, and the second lens is set to provide a gap between the first lens body and a major surface of the lightguide that opposes the first lens body.

16. The combiner lens of claim 1, further comprising a seat formed on the flange, wherein the second lens is mounted on the seat.

17. The combiner lens of claim 16, wherein a height of the seat relative to the stack formed by the first lens body, the lightguide, and the second lens is set to provide a gap between the second lens and a major surface of the lightguide that opposes the second lens.

18. The combiner lens of claim 1, wherein the flange is an annular flange.

19. A wearable heads-up display, comprising:
a support frame having a frame front and at least one temple coupled to a side of the frame front; and
a combiner lens mounted to the frame front, the combiner lens comprising:
a first lens including a first lens body and a flange integrally formed with the first lens body, the first lens body and flange defining a main cavity, the flange having a first joint surface;
a lightguide disposed at least partially in the main cavity; and
a second lens including a second lens body positioned in stack with the lightguide and the first lens body, the second lens having a second joint surface in opposing relation to the first joint surface, the second lens attached to the first lens by a joint formed between the first joint surface and the second joint surface.

20. A method of making a combiner lens, comprising:
stacking a lightguide relative to a lens body of a first lens by disposing the lightguide in a cavity defined by the lens body of the first lens and a flange of the first lens;
positioning a joint surface of a second lens in opposing relation to a joint surface of the flange by stacking the second lens relative to the lightguide and lens body of the first lens; and
attaching the second lens to the first lens by forming a joint between the joint surface of the flange and the joint surface of the second lens.

* * * * *